(12) United States Patent
Niemiec

(10) Patent No.: US 10,189,443 B2
(45) Date of Patent: Jan. 29, 2019

(54) VIRTUAL KEY FOR VEHICLE SERVICING

(71) Applicant: GM GLOBAL TECHNOLOGY OPERATIONS LLC, Detroit, MI (US)

(72) Inventor: Scott A. Niemiec, West Bloomfield, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 41 days.

(21) Appl. No.: 15/348,512

(22) Filed: Nov. 10, 2016

(65) Prior Publication Data

US 2018/0126952 A1 May 10, 2018

(51) Int. Cl.
*B60R 25/24* (2013.01)
*G07C 5/00* (2006.01)
*G07C 9/00* (2006.01)
*G06Q 10/00* (2012.01)
*G07C 5/08* (2006.01)

(52) U.S. Cl.
CPC ............ *B60R 25/24* (2013.01); *B60R 25/241* (2013.01); *G06Q 10/20* (2013.01); *G07C 5/006* (2013.01); *G07C 5/0808* (2013.01); *G07C 9/00007* (2013.01); *G07C 9/00571* (2013.01)

(58) Field of Classification Search
CPC . B60R 25/24; B60R 25/241; B60R 2325/202; B60R 2325/205; G07C 5/006; G07C 5/0808; G07C 9/00007; G07C 9/00119; G07C 9/00309; G07C 9/00571; G06Q 10/20
See application file for complete search history.

(56) References Cited

U.S. PATENT DOCUMENTS

| 9,365,188 | B1* | 6/2016 | Penilla | B60R 25/2018 |
| 9,697,503 | B1* | 7/2017 | Penilla | G06Q 10/20 |
| 2005/0176482 | A1* | 8/2005 | Raisinghani | B60R 16/0234 455/575.9 |
| 2009/0089134 | A1* | 4/2009 | Uyeki | G06Q 10/02 705/7.19 |
| 2013/0194068 | A1* | 8/2013 | Monig | B60R 25/24 340/5.61 |
| 2015/0161832 | A1* | 6/2015 | Esselink | G07C 9/00015 340/5.22 |
| 2016/0059826 | A1* | 3/2016 | Krishnan | B60R 25/24 340/5.6 |
| 2016/0060909 | A1* | 3/2016 | Krishnan | G07C 9/00182 292/194 |
| 2016/0098870 | A1* | 4/2016 | Bergerhoff | G07C 9/00007 340/5.61 |

(Continued)

FOREIGN PATENT DOCUMENTS

| DE | 102011018901 A1 * | 10/2011 |
| JP | 2005226438 A * | 8/2005 |
| JP | 2005226439 A * | 8/2005 |

*Primary Examiner* — Behrang Badii
*Assistant Examiner* — David A Testardi
(74) *Attorney, Agent, or Firm* — Cantor Colburn LLP

(57) ABSTRACT

Technical solutions are described for facilitating access for servicing a vehicle. An example computer-implemented method includes receiving a servicing notification for the vehicle, and generating, in response, a virtual key for servicing the vehicle. The computer-implemented method also includes facilitating access for servicing the vehicle based on the virtual key.

12 Claims, 3 Drawing Sheets

(56) References Cited

U.S. PATENT DOCUMENTS

| | | | |
|---|---|---|---|
| 2016/0098871 A1* | 4/2016 | Oz | G07C 9/00111 340/5.61 |
| 2016/0203661 A1* | 7/2016 | Pudar | B60R 25/24 340/5.25 |
| 2017/0101076 A1* | 4/2017 | Krishnan | G07C 9/00817 |
| 2017/0134382 A1* | 5/2017 | Darnell | H04L 63/10 |
| 2017/0330402 A1* | 11/2017 | Menard | G07C 9/00309 |
| 2017/0349146 A1* | 12/2017 | Krishnan | B60R 25/241 |
| 2018/0012272 A1* | 1/2018 | Menard | G06Q 30/0609 |

* cited by examiner

VIRTUAL KEY FOR VEHICLE SERVICING

TECHNICAL FIELD

The present disclosure relates to integrating virtual key, vehicle diagnostics, and telematics communication in a vehicle, particularly for facilitating servicing of the vehicle.

INTRODUCTION

A vehicle, such as a car, a motorcycle, a boat, or any other type of automobile is typically serviced on a periodic basis. Alternatively or in addition, the vehicle may be serviced in case the vehicle is diagnosed with an issue. Typically, a user of the vehicle, such as an owner, a lessee, a fleet manager, or any other type of a user of the vehicle takes the vehicle to a service provider, such as a dealership, a mechanic, or any other type of service provider to service the vehicle. The servicing may include diagnosing, repairing, updating, cleaning, fluids topping-off, vehicle fueling, inspecting, or any other operations to maintain and/or enhance the performance level of the vehicle. However, the user may not be in a position to take the vehicle for the servicing at a designated time, such as according to the servicing schedule, when a vehicle issue arises, or the like.

SUMMARY

According to one or more exemplary embodiments, a computer-implemented method for facilitating access for servicing a vehicle includes receiving a servicing notification for the vehicle, and generating, in response, a virtual key for servicing the vehicle. The computer-implemented method also includes facilitating access for servicing the vehicle based on the virtual key.

According to one or more exemplary embodiments, a system for facilitating access for servicing a vehicle includes a telematics module configured to transmit a servicing notification for servicing the vehicle. The system also includes a virtual key generator configured to generate a virtual key for servicing the vehicle in response. The system also includes a virtual key module configured to facilitate access to the vehicle in response to the virtual key for servicing the vehicle being within a predetermined vicinity of the vehicle.

According to one or more exemplary embodiments, a computer program product for facilitating access for servicing a vehicle includes non-transitory storage medium with computer executable instructions embedded therein. The non-transitory storage medium includes instructions to receive a servicing notification for servicing the vehicle. The non-transitory storage medium also includes instructions to generate a virtual key for servicing the vehicle in response. The non-transitory storage medium also includes instructions to facilitate access to the vehicle in response to the virtual key for servicing the vehicle being within a predetermined vicinity of the vehicle.

The above features and advantages, and other features and advantages, of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

Figure 1:
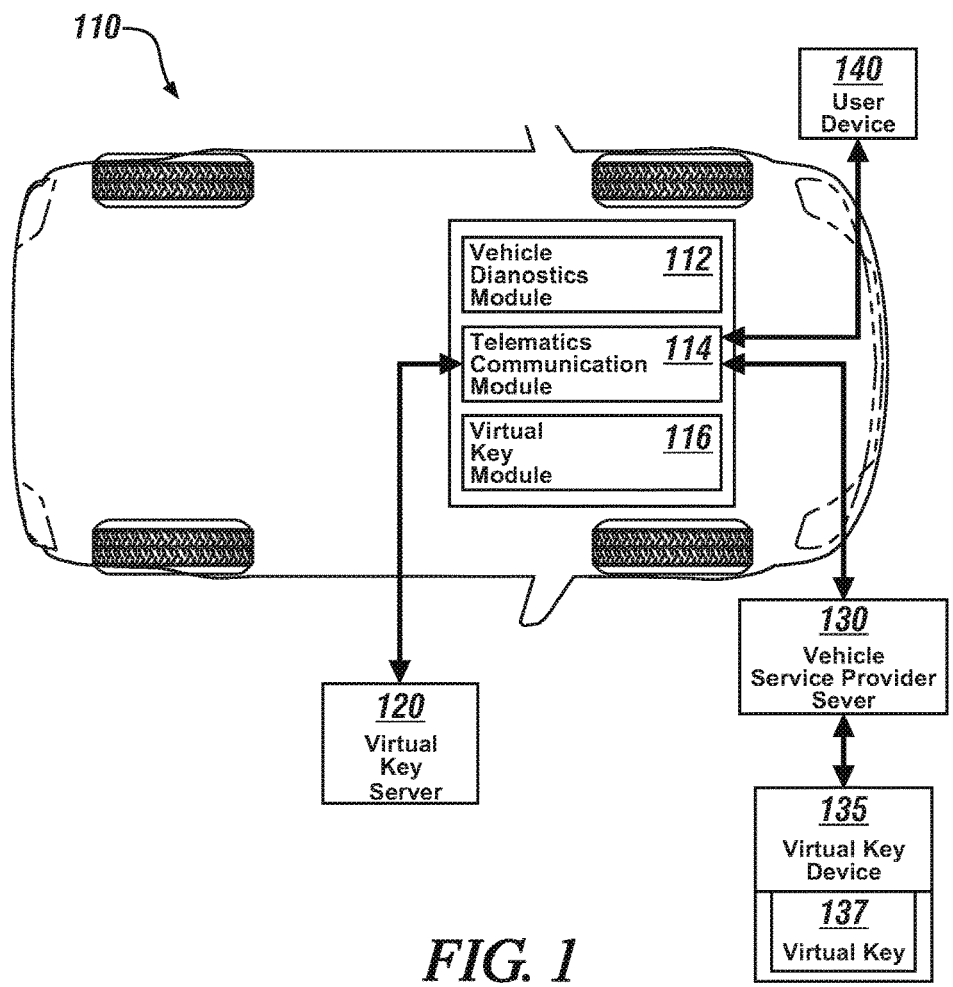
FIG. 1 illustrates an example system for facilitating servicing of a vehicle using a virtual key.

The following description is merely exemplary in nature and is not intended to limit the present disclosure, its application, or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein include virtual service features in which vehicle service is performed with reduced user interaction and inconvenience. For example, a user may not be in a position to take the vehicle for servicing at a designated time, such as according to a servicing schedule, when a vehicle issue arises, or the like; or at the least, the user may be inconvenienced by taking the vehicle for servicing. In one or more examples, the technical solutions facilitate generating a virtual key for the vehicle, which in turn facilitates accessing the vehicle by an authorized service personnel. The authorized service personnel accesses the vehicle by using the virtual key via a communication device, such as via a smartphone, a tablet computer, a key-fob, or any other electronic device that is associated with the virtual key. Further, in one or more examples, the technical solutions facilitate coupling generation of the virtual key with vehicle diagnostics, and telematics communication modules of the vehicle to improve vehicle maintenance. Thus, the technical solutions described herein facilitate improving vehicle maintenance and performance, by facilitating authorized service personnel to access the vehicle using a virtual key. Accordingly, the technical solutions facilitate servicing of the vehicle even if the user is not in a position to take the vehicle for the servicing. Further, the technical solutions facilitate scheduling, increasing user enthusiasm, increasing vehicle service revenue, and reducing warranty cost.

FIG. 1 illustrates an example system for facilitating servicing of a vehicle using a virtual key. The system includes a vehicle 110, a virtual key server 120, a service provider server 130, a virtual-key device 135, and a user device 140. In other examples, the system may include fewer, additional, or different components than those listed above.

The vehicle 110 may be any vehicle, such as a car, a sports utility vehicle, a van, a truck, a tractor, or any other type of automobile. The vehicle 110 may include, among other components, a vehicle diagnostic module 112, a telematics communication module 114, and a virtual key module 116.

The virtual key module 116 facilitates accessing the vehicle 110 using a virtual key, which may be associated with a virtual key device 135. The virtual key device 135 may be a hardware device, such as a key-fob, a phone, a smartphone, a tablet computer, a smart card, or any other device that is associated with the virtual key. The virtual key is an electronic key that facilitates providing access to the vehicle 110. In one or more examples, the virtual key device 135 receives and stores the virtual key. In one or more examples, the virtual key device 135 transmits the virtual key to the virtual key module 116 using short-range communication, such as BLUETOOTH™, NFC™ (Near Field Communication), ZIGBEE™, or any other such short-range communication protocols. For example, the short-range communication may facilitate the virtual key device 135 to communicate with the virtual key module 116 within a predetermined distance, such as 10 meters, 5 meters, or any other predetermined vicinity. In one or more examples, the virtual key device 135 communicates the virtual key to the virtual key module 116 when the virtual key device 135 is in physical contact with the virtual key module 116, or the vehicle 110; for example, when the virtual key device 135 touches the vehicle 110, a door-handle of the vehicle 110, or the like. In other examples, the virtual key device 135 may facilitate access to the vehicle 110 in an additional or different manner than those listed above.

In one or more examples, the virtual key authorizes the virtual key device 135 to access the vehicle 110 at a predetermined time and/or at a predetermined location. The virtual key device 135 may access the vehicle 110 at a specific location, within a specific range of time. The virtual key device 135 may be authorized access to the vehicle 110 when the vehicle 110 is parked within specific vicinity and from 9:00 AM to 5:00 PM on Friday, Aug. 5, 2016, for example. Alternatively or in addition, the virtual key may have a limited access to the vehicle 110. For example, the virtual key 137 associated with the virtual key device 135 may facilitate accessing only specific parts of the vehicle 110. If the virtual key 137 is for authorizing servicing the vehicle 110, the virtual key 137 may not permit access to parts such as glove box, boot, center console, and/or the like.

In one or more embodiments, a virtual key server 120 generates the virtual key 137 in response to a request for generating a virtual key. Alternatively or in addition, the virtual key module 116 generates the virtual key 137 in response to receiving the request for generating a virtual key. The request may specify a level of access that identifies which parts of the vehicle 110 can be accessed using the virtual key 137. The request for generating a virtual key may further specify the identity of a recipient of the virtual key 137. Accordingly, the virtual key generator ensures that only the authorized recipient receives the virtual key 137. For example, the identity may include a name, an address, a password, an alphanumeric identifier, an IP address, a MAC address, a serial number, or the like or a combination thereof. In one or more embodiments, the identity is a unique identifier for the virtual key device 135. The request may include an IP address, or a MAC address, or a serial number of the virtual key device 135 with which the virtual key 137 is to be associated.

If the virtual key device 135 is an electronic communication device, such as a smartphone, the request may include the MAC address of the virtual key device 135. The virtual key 137 may be generated specifically for the MAC address, so that another virtual key device 135 cannot access the vehicle 110 even if the virtual key 137 is stored on the other virtual key device. Alternatively or in addition, in case the virtual key device 135 is a device without a MAC address, such as a smart card, RFID tag, or the like, the virtual key 137 may be generated specifically for the serial number or any other unique identifier associated with the virtual key device 135. Such a virtual key device 135 stores the virtual key 135 for access by the virtual key module 116. For example, when the virtual key device 135 is in vicinity (a predetermined distance) from the vehicle 110 and/or from the virtual key module 116, the virtual key 137 of the virtual key device 135 facilitates access to specific parts of the vehicle 110.

The vehicle diagnostics module 112 may determine if the vehicle 110 is in need for servicing. The telematics communication module 114, in response, sends a notification that is indicative that the vehicle 110 is to be serviced. For example, the vehicle diagnostics module 112 determines if the vehicle is to be serviced according to a servicing schedule, such as every three months or any other predetermined duration. Accordingly, the telematics communication module 114 transmits the notification in response to the servicing schedule.

Alternatively or in addition, the vehicle diagnostics module 112 determines if the vehicle 110 is to be serviced according to a predetermined condition such as the vehicle 110 being driven for a predetermined number of miles (for example, 50,000 miles, 75,000 miles), or a number of miles (or time) since the most recent servicing (for example, 5,000 miles, 2,500 miles). The telematics communication module 114 transmits the notification in response, according to the servicing condition.

Alternatively or in addition, the vehicle diagnostics module 112 determines if the vehicle is to be serviced based on data from one or more sensors equipped in the vehicle 110. For example, the vehicle 110 may be equipped with sensors such as one or more tire sensors, brake sensors, fluids sensors, and various other sensors that monitor the performance of corresponding components of the vehicle. The vehicle diagnostic module 112 receives the performance data from the sensors over an intra-vehicle communication network, such as using a controller area network (CAN) bus, or any other type of network and/or protocol. By monitoring the data from the sensors, the vehicle diagnostic module 112 determines if the performance of the vehicle 110 has deteriorated; for example by comparing the data from the sensors with predetermined thresholds. In response, the vehicle diagnostic module 112 may instruct the telematics communication device 114 to transmit the notification requesting servicing of the vehicle 110.

In one or more examples, the vehicle diagnostics module 112 and the telematics module 114 may be part of a vehicle maintenance module, such as ONSTAR™, which provides vehicle service and maintenance information.

In one or more examples, the user of the vehicle 110 enters into a service contract with a service provider to service the vehicle 110. The service provider may monitor the vehicle 110. For example, a service provider server 130 receives the notification from the telematics communication module 114 that indicates that servicing is to be performed on the vehicle 110. The service provider server 130 may be a server computer, a desktop computer, a phone, a smartphone, a tablet computer, a laptop computer, or any other electronic communication device.

Upon receiving a "service required" notification, the service provider server 130 may request a service authorization from the user. For example, the service provider server 130 sends a service authorization request to a user device 140. The user device 140 may be a server computer, a desktop computer, a phone, a smartphone, a tablet computer, a laptop computer, or any other electronic communication device. The user, via the user device 140 sends a service authorization to the service provider server 130.

In one or more examples, the user may select the service provider for servicing the vehicle 110 on a per instance basis. The user may select a first service provider for a first servicing, a second service provider for a second servicing, and so on. In an embodiment, the user receives the notification from the telematics communication module 114, such as via a user device 140. In such a case, upon receiving the notification, the user via the user device 140, sends a request for servicing to the service provider server 130 of the service provider. Upon receipt of the servicing request, the service provider server 130 may send a service authorization request to a user device 140. The user, via the user device 140 sends a service authorization to the service provider server 130.

Figure 2:
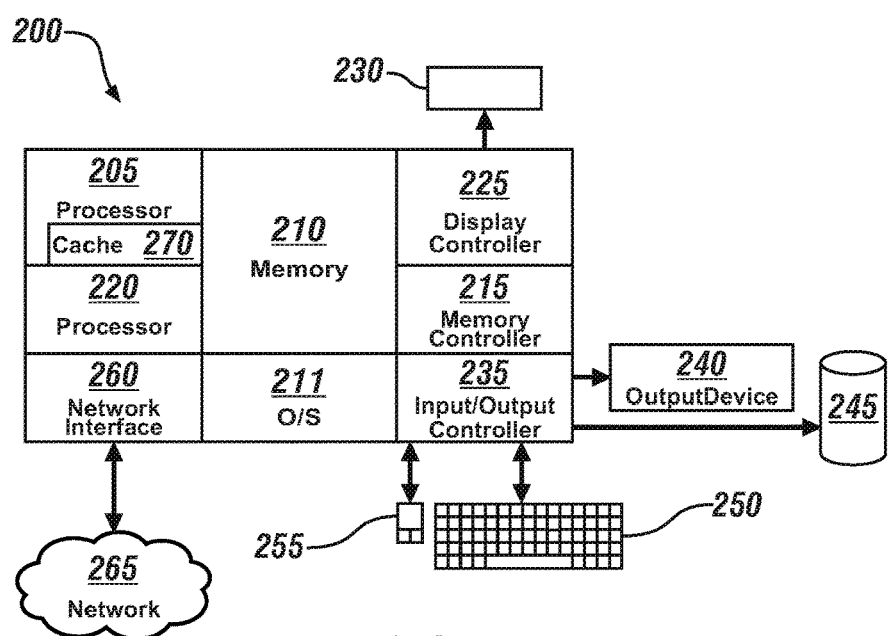
FIG. 2 illustrates example components of a system for facilitating servicing of a vehicle using a virtual key.

FIG. 2 illustrates an example system 200. In embodiments, the system 200 includes one or more of the vehicle diagnostics module 112, the telematics module 114, and the virtual key module 116. Alternatively or in addition, each of the modules may be a separate system with example components as illustrated by the system 200. For example, the system 200 may be a central computer, or any other device that controls operations of the one or more electronic control units (ECU) of the vehicle 110. In an example, the system 200 communicates via a network 265. The system 200 includes hardware, such as electronic circuitry.

The system 200 includes, among other components, a processor 205, memory 210 coupled to a memory controller 215, and one or more input devices 245 and/or output devices 240, such as peripheral or control devices, that are communicatively coupled via a local I/O controller 235. These devices 240 and 245 may include, for example, battery sensors, position sensors (altimeter 40, accelerometer 42, GPS 44), indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or a commercially available processor, a central processing unit (CPU), an auxiliary processor among several processors associated with the system 200, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remotely from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods of this disclosure.

The system 200 may further include a display controller 225 coupled to a user interface or display 230. In some embodiments, the display 230 may be an LCD screen. In other embodiments, the display 230 may include a plurality of LED status lights. In some embodiments, the system 200 may further include a network interface 260 for coupling to a network 265. The network 265 may be an IP-based network for communication between the system 200 and an external server, client and the like via a broadband connection. In an embodiment, the network 265 may be a satellite network. The network 265 transmits and receives data between the system 200 and external systems. In some embodiments, the network 265 may be a managed IP network administered by a service provider. The network 265 may be implemented in a wireless fashion, for example, using wireless protocols and technologies, such as WiFi, WiMax, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 3:
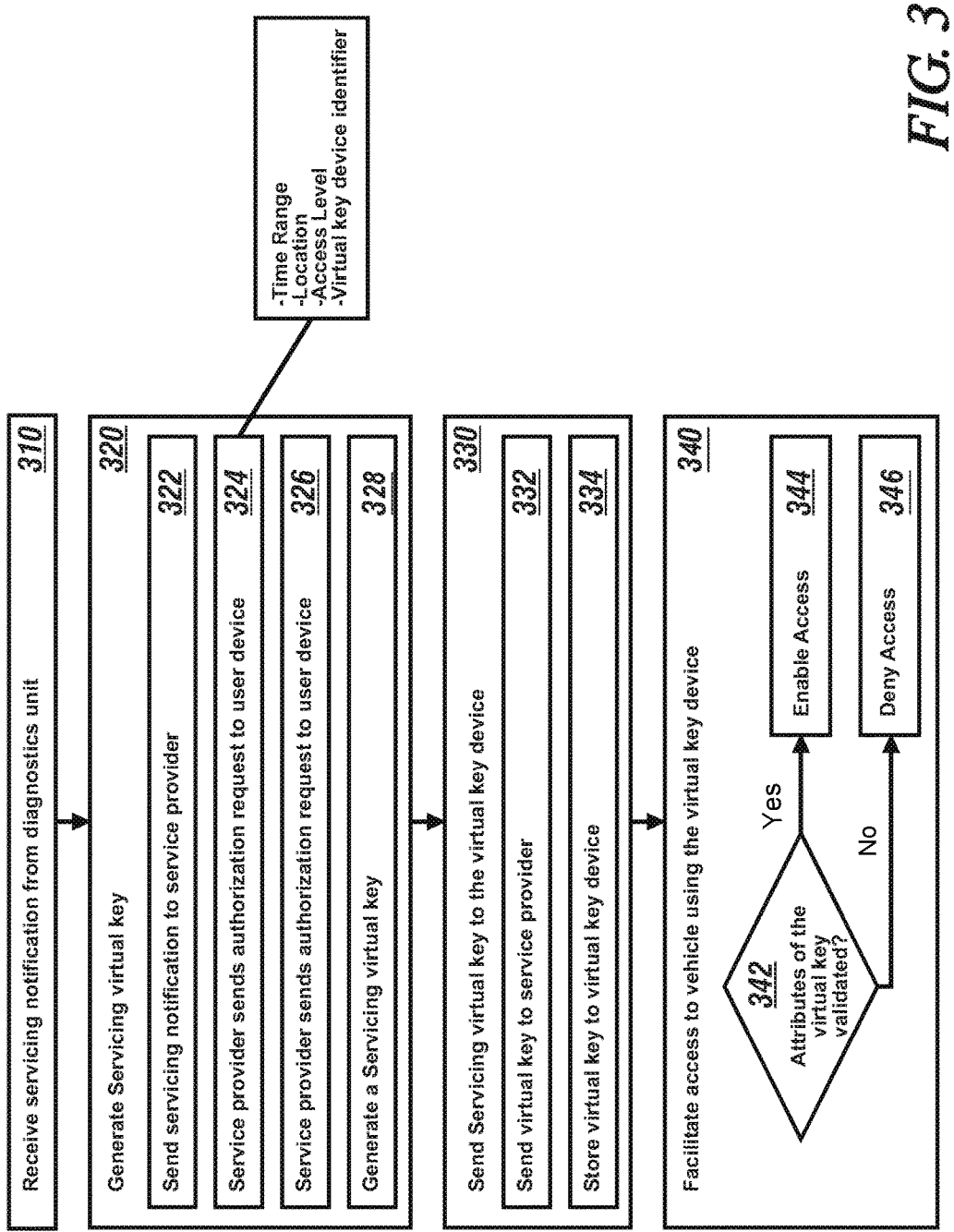
FIG. 3 illustrates a flowchart of an example method for facilitating servicing of a vehicle using a virtual key.

FIG. 3 illustrates a flowchart of an example method for facilitating access to the vehicle 110 via the virtual key 137 for servicing the vehicle 110. In one or more examples, the system 200 implements the method. Alternatively, the vehicle diagnostics module 112, the telematics module 114, and the virtual key module 116 implement the method. For example, the method includes receiving a servicing notification from the vehicle diagnostics module 112, as shown at block 310. As described herein, the servicing notification may be based on a servicing schedule and/or diagnostic sensor information. In response, the method includes generating the virtual key 137 for servicing the vehicle 110, as shown at block 320.

In one or more examples, generating the virtual key 137 includes receiving authorization for the virtual key 137. In one or more examples, the telematics module 114 sends the servicing notification for receipt by the service provider server 130, as shown at block 322. The service provider server 130 sends an authorization request to the user device 140, and another authorization request to the vehicle key server 120, as shown at blocks 324 and 326. Alternatively or in addition, the service provider server 130 sends the first authorization request to the user device 140, which in turn sends the second authorization request to the virtual key server 120. In one or more examples, the second authorization request is generated based on the first authorization request. For example, the second authorization request may include identification information of the user and/or the user device 140 to validate that the user is authorized to request access for the vehicle 110.

In one or more examples, an authorization request, the first and the second authorization request, includes one or more of a time range, a location, an access level, and an identifier of the virtual key device 135, among other attributes. For example, the time range indicates a duration during which the virtual key 137 facilitates access to the vehicle 110. The location indicates a vicinity in which the virtual key 137 facilitates access to the vehicle 110. The access level indicates which parts of the vehicle 110 are accessible via the virtual key 137. Further, the identifier of the virtual key device 135 is a unique identifier of the virtual key device 135. As described herein, the virtual key 137 is mapped to the unique identifier to prevent unauthorized use of the virtual key 137 via any device other than the virtual key device 135.

In one or more examples, the service provider server 130 sends the first authorization request to the user device 140 requesting a specific time, a location, and, an access level for the virtual key 137. The user device 140 may respond in agreement, or respond countering the attributes of the first authorization request. Once the service provider server 130 and the user device 140 agree upon the attributes of the virtual key 137, the second authorization request is generated that includes the agreed upon attributes. In one or more examples, the service provider server 130 generates and sends the second authorization request to the virtual key generator, which may be the virtual key server 120, or the virtual key module 116. Alternatively or in addition, the user device 140 generates and sends the second authorization request to the virtual key generator.

In response, the virtual key server 120 generates the virtual key 137, which may be a servicing virtual key, as shown at block 328. For example, the virtual key 137 may facilitate access to the vehicle 110 according to the one or more attributes associated with the authorization request. As described herein, in one or more examples, the virtual key 137 may be generated by the virtual key module 116 instead of the virtual key server 120.

The method further includes sending the virtual key 137 for receipt by the virtual key device 135, as shown at block 330. In one or more examples, the service provider server 130 receives the virtual key 137, as shown at block 332. The service provider server 130 further stores the virtual key 137 on the virtual key device 135, as shown at block 334. Alternatively or in addition, the virtual key server 120 sends the virtual key 137 to the virtual key device 135. Alternatively or in addition, the virtual key module 116 generates and sends the virtual key 137 to the virtual key device 135.

Further, the method includes facilitating access to the vehicle 110 according to the virtual key 137, as shown at block 340. For example, personnel from the service provider may access the vehicle 110 using the virtual key 137. The virtual key module 116 compares the attributes associated with the virtual key 137 to ensure that the virtual key 137 is authorized to access the vehicle 110. For example, the virtual key module 116 determines if attributes of the virtual key 137 are validated, as shown at block 342. For example, the virtual key module 116 determines if the vehicle 110 is in the vicinity specified by the virtual key 137. In one or more examples, the virtual key module 116 includes a global positioning system (GPS) to determine the location of the vehicle 110. Further, the virtual key module 116 determines if the vehicle 110 is being accessed within the time duration specified by the virtual key 137. In one or more examples, the virtual key module 116 includes a clock to determine the current time. Further, the virtual key module 116 determines if the virtual key device 135 matches the identifier included in the virtual key 137. If the one or more attributes are validated successfully, the virtual key module 116 unlocks the vehicle 110 according to the access level specified in the virtual key 137, as shown at block 344. Otherwise, the virtual key module 116 denies access, as shown at block 346.

Figure 4:
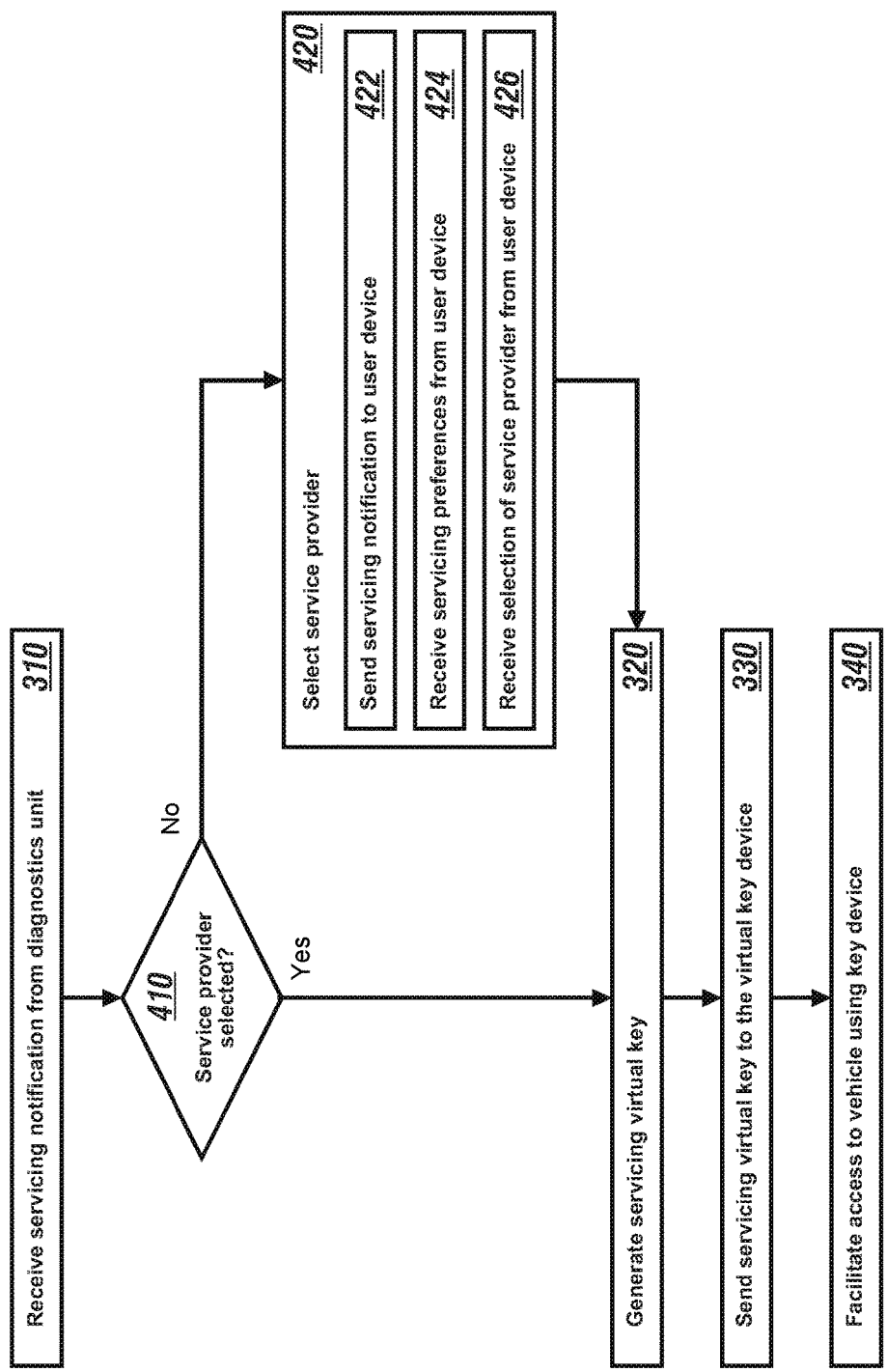
FIG. 4 illustrates a flowchart of an example facilitating servicing of a vehicle using a virtual key.

FIG. 4 illustrates a flowchart of another example method for facilitating access to the vehicle 110 via the virtual key 137 for servicing the vehicle 110. In one or more examples, the system 200 implements the method. Alternatively, the vehicle diagnostics module 112, the telematics module 114, and the virtual key module 116 implement the method. For example, the method includes receiving a servicing notification from the vehicle diagnostics module 112, as shown at block 310.

In response, the system 200 determines if a service provider has been selected for servicing the vehicle 110, as shown at block 410. For example, if the service provider has been selected, identifying information of the service provider may be saved in the system 200. If the service provider is selected, the method proceeds as described herein with respect to FIG. 3. For example, the method includes generating the servicing virtual key for the selected service provider, sending the servicing virtual key to the virtual key device 135, and facilitating access to vehicle 110 using the virtual key device 135, as shown at blocks 320, 330, and 340.

Instead, if the service provider is not pre-selected, the system 200 facilitates selection of the service provider, as shown at block 420. For example, the system 200 sends the servicing notification to the user device 140, as shown at block 422. In one or more examples, the system 200 requests servicing preferences, such as user availability. In response, the user device 140 sends the servicing preferences to the system 200, as shown at block 424. For example, the user device 140 indicates a time at which to service the vehicle 110. The user device 140 further indicates a location for the servicing, such as home-address, office-address, or any other location associated with the user.

In one or more examples, the system 200 generates a list of service providers that are available to service the vehicle according to the servicing preferences specified by the user device 140, as shown at block 426. The list may include a rating, a price, and other parameters associated with each of the service providers in the list for performing the servicing. The user device 140 may send a selection of a service providers to the system 200. For example, the user selects a service provider and sends the service provider information to the system 200 via the user device 140. Alternatively or in addition, the user device 140 selects and sends information of the selected service provider independent of the system 200, for example based on recommendations from friends, family, online reviews, or the like.

Once the service provider is selected, the method includes generating the virtual key 137, sending the virtual key 137 to the virtual key device 135, and facilitating the selected service provider access to vehicle 110 using the virtual key device 135, as shown at blocks 320, 330, and 340, and as described herein.

Accordingly, the technical solutions described herein facilitate an improved vehicle service and maintenance scheduling. For example, the technical solutions facilitate vehicle service pickup and/or servicing without the user being present. Further, the service pickup and/or the servicing may be scheduled at an off peak time according to convenience of both the user and the service provider.

For example, after driving a predetermined number of miles, or after a predetermined amount of time, the vehicle requires an oil change. The diagnostic module, such as ONSTAR™ recognizes that the oil change is to be performed, and notifies a preselected service provider and/or the user. In one or more examples, the service provider requests user permission for virtual pickup and/or servicing by requesting a virtual key. For example, the user may receive the request via a smartphone application, an email, a text message, or any other communication via a user device. The user device initializes a virtual key authority to the service provider after confirming that the vehicle is available and accessible at the agreed upon location, and time. The service provider receives and stores the virtual key on an authorized device, such as a smartphone or any other communication device. The service organization picks up and/or services the vehicle using the virtual key, and returns the vehicle to the agreed upon location, at the agreed upon time. In one or more examples, the pickup location may be different from the drop-off location.

The technical solutions described herein increases customer enthusiasm, increase vehicle service and maintenance revenue, and reduce vehicle warranty cost.

The present technical solutions may comprise a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, such as example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A computer-implemented method for unlocking a vehicle for servicing the vehicle, the method comprising:
   receiving, by a telematics module, a sensor measurement of the vehicle from a diagnostic sensor of the vehicle;
   determining, by a vehicle diagnostic module, a servicing request for the vehicle based on the sensor measurement;
   generating, by a virtual key generator, a virtual key for servicing the vehicle, the virtual key including a time duration, a geographic location for servicing the vehicle, and an identifier of a specific virtual key device to be used to unlock the vehicle, wherein generating the virtual key comprises:
      sending, by a service provider server, a servicing authorization request to a user device;
      receiving, by the service provider server, from the user device, a selection of a service provider to service the vehicle and a selection of the geographic location at which to service the vehicle, wherein the service provider has the specific virtual key device;
      sending, by the service provider server, a first authorization request to the user device, the first authorization request includes a time range for accessing the vehicle at the geographic location by the service provider;
      receiving, by the virtual key generator, from the user device, a selection of the time duration at which to service the vehicle at the geographic location, the selection of the time duration made from within the time range;
      generating, by the virtual key generator, the virtual key using the geographic location, the time duration, and the identifier of the specific virtual key device; and
      sending, by the virtual key generator, the virtual key to the specific virtual key device; and
   unlocking, by a virtual key module, the vehicle to allow access for servicing the vehicle based on the specific virtual key device when the specific virtual key device associated with the identifier has the virtual key stored therein, and is brought within a predetermined vicinity of the vehicle at the geographic location and during the time duration.

2. The computer-implemented method of claim 1, wherein the servicing request is determined according to a predetermined servicing schedule.

3. The computer-implemented method of claim 1, wherein generating the virtual key for servicing the vehicle further comprises:
   sending, by the user device, second authorization request for the virtual key to the virtual key generator.

4. The computer-implemented method of claim 3, wherein the second authorization request specifies the time duration for accessing the vehicle.

5. The computer-implemented method of claim 3, wherein the second authorization request specifies the location for accessing the vehicle.

6. The computer-implemented method of claim 3, wherein the second authorization request specifies the identifier of the specific virtual key device for storing the virtual key.

7. The computer-implemented method of claim 1, wherein the specific virtual key device is an electronic communication device.

8. A system for unlocking a vehicle, the system comprising:
   a diagnostic module configured to generate a servicing notification for the vehicle based on one or more sensor measurements;
   a virtual key generator configured to generate a virtual key for servicing the vehicle, the virtual key including a time duration, a geographic location for servicing the vehicle, and an identifier of a specific virtual key device to be used to unlock the vehicle, wherein generating the virtual key comprises:
      sending, using a telematics module, a servicing authorization request to a user device;
      receiving, from the user device, a selection of a service provider to service the vehicle and a selection of the geographic location at which to access the vehicle for servicing, the service provider having the specific virtual key device;
      sending, by a service provider server, a first authorization request to the user device, the first authorization request includes a time range for servicing the vehicle at the geographic location by the service provider;
      receiving, from the user device, a selection of the time duration at which to service the vehicle at the geographic location, the selection made from the time range;
      generating, by a virtual key generator, the virtual key using the geographic location, the time duration, and the identifier of the specific virtual key device; and
      sending, by the virtual key generator, to the specific virtual key device, the virtual key; and
   a virtual key module configured to unlock the vehicle when the specific virtual key device of the service provider that is selected for servicing the vehicle is within a predetermined vicinity of the vehicle.

9. The system of claim 8, wherein the diagnostic module generates the servicing notification according to a predetermined servicing schedule.

10. The system of claim 8, wherein the authorization request authorizes the virtual key to unlock the vehicle only by the specific virtual key device that stores the virtual key.

11. A computer program product for unlocking a vehicle for servicing the vehicle, the computer program product comprising non-transitory storage medium with computer executable instructions embedded therein, the non-transitory storage medium comprising instructions to:
   generate a servicing notification for servicing the vehicle based on one or more sensor measurements;
   generate a virtual key for servicing the vehicle, the virtual key including a time duration, a geographic location for servicing the vehicle, and an identifier of a specific virtual key device to be used to unlock the vehicle, wherein generating the virtual key comprises:
      sending a servicing authorization request to a user device;
      receiving, from the user device, a selection of a service provider to service the vehicle and the geographic location at which to service the vehicle, the service provider has the specific virtual key device;
      sending, by service provider server, a first authorization request to the user device, the first authorization request includes a time range for servicing the vehicle at the geographic location by the service provider;
      receiving, from the user device, a selection of the time duration at which to service the vehicle at the geographic location, the time duration selected from the time range;
      generating, by a virtual key generator, the virtual key using the geographic location, the time duration, and the identifier of the specific virtual key device; and
      sending, by the virtual key generator, to the specific virtual key device, the virtual key; and
   unlock the vehicle when the specific virtual key device of the service provider selected for servicing the vehicle is within a predetermined vicinity of the vehicle.

12. The computer program product of claim 11, wherein the non-transitory storage medium further comprises instructions to:
   generate the virtual key to unlock the vehicle only by the specific virtual key device that stores the virtual key.

* * * * *